US011640323B2

(12) United States Patent
Opsenica et al.

(10) Patent No.: US 11,640,323 B2
(45) Date of Patent: May 2, 2023

(54) METHOD AND MACHINE LEARNING AGENT FOR EXECUTING MACHINE LEARNING IN AN EDGE CLOUD (71) Applicant: TELEFONAKTIEBOLAGET LM ERICSSON (PUBL), Stockholm (SE)

(72) Inventors: Miljenko Opsenica, Espoo (FI); Joel Patrik Reijonen, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/296,698

(22) PCT Filed: Dec. 13, 2018

(86) PCT No.: PCT/SE2018/051308
§ 371 (c)(1),
(2) Date: May 25, 2021

(87) PCT Pub. No.: WO2020/122778
PCT Pub. Date: Jun. 18, 2020

(65) Prior Publication Data
US 2022/0058056 A1 Feb. 24, 2022

(51) Int. Cl.
G06F 9/50 (2006.01)
G06N 20/00 (2019.01)
G05B 19/418 (2006.01)

(52) U.S. Cl.
CPC ......... G06F 9/505 (2013.01); G05B 19/4183 (2013.01); G06N 20/00 (2019.01)

(58) Field of Classification Search
None
See application file for complete search history.

(56) References Cited

U.S. PATENT DOCUMENTS 11,169,288 B1 * 11/2021 Johnson ................. G01V 1/306
2013/0159486 A1 6/2013 Vasseur
(Continued)

FOREIGN PATENT DOCUMENTS

CN 108427992 A 8/2018
WO 2020067938 A1 4/2020

OTHER PUBLICATIONS

International Search Report / Written Opinion dated Sep. 19, 2019 in corresponding/related PCT Application No. PCT/SE2018/051308.

(Continued)

Primary Examiner — James A Edwards
(74) Attorney, Agent, or Firm — Patent Portfolio Builders PLLC (57) ABSTRACT Method and machine learning agent for executing machine learning on an industrial process by using computing resources in an edge cloud. A state of the industrial process is identified (2:1) and a learning model comprising a training algorithm for the machine learning is selected (2:2) based on the identified state. The training algorithm in the selected model is then adapted (2:4) so that the amount of available computing resources in the edge cloud is sufficient for computations in the training algorithm. The adapted training algorithm is finally applied (2:5) on data generated in the industrial process using computing resources in the edge cloud. Thereby, computing resources in the edge cloud can be used and no additional resources are needed, thus reducing latency and bandwidth consumption.

15 Claims, 4 Drawing Sheets (56) References Cited

U.S. PATENT DOCUMENTS

| | | | |
|---|---|---|---|
| 2015/0106308 A1 | 4/2015 | Harrison et al. | |
| 2016/0217388 A1 | 7/2016 | Okanohara et al. | |
| 2017/0279839 A1 | 9/2017 | Vasseur et al. | |
| 2018/0060744 A1 | 3/2018 | Achin et al. | |
| 2018/0253665 A1 | 9/2018 | Okanohara et al. | |
| 2018/0300124 A1* | 10/2018 | Malladi | G06F 9/542 |
| 2018/0314971 A1 | 11/2018 | Chen et al. | |
| 2018/0322417 A1 | 11/2018 | Bendre et al. | |
| 2019/0042884 A1* | 2/2019 | Guim Bernat | H04L 67/10 |
| 2019/0079898 A1* | 3/2019 | Xiong | G06F 9/5072 |
| 2020/0050951 A1* | 2/2020 | Wang | G06N 5/043 |
| 2020/0151619 A1* | 5/2020 | Mopur | G06N 5/047 |
| 2020/0160227 A1* | 5/2020 | Liu | G06N 20/00 |

OTHER PUBLICATIONS

Extended European Search Report in corresponding/related European Application No. 18942933.5 dated May 25, 2022.

* cited by examiner

METHOD AND MACHINE LEARNING AGENT FOR EXECUTING MACHINE LEARNING IN AN EDGE CLOUD

TECHNICAL FIELD

The present disclosure relates generally to a method and a machine learning agent, for executing machine learning on an industrial process by using computing resources in an edge cloud.

BACKGROUND

In the field of cloud computing, resources for computing, processing and storing of data can be hired and used temporarily, e.g. for execution of machine learning operations. When an operation or task is completed, the used resources are released to become available for other operations. Such cloud resources may be deployed in large data centers, commonly known as "the cloud", which are typically attached to various communications networks. The communications networks mentioned herein may be any type of networks that can be used by clients for accessing the cloud, e.g. including wireless, fixed, public and private networks, using any suitable protocols and standards for communication.

Machine learning (ML) operations are usually executed on huge amounts of data generated in an industrial process. For example in the field of telecommunication, data may be provided by various communication devices and nodes, such as network nodes, servers, wireless devices, Machine-to-Machine devices, Internet-of-Things, IoT, devices, and so forth. In this disclosure, the term "industrial process" is used to generally denote a process in any equipment that generates data on which machine learning operations can be executed. Even though the field of telecommunication is mentioned as an illustrative example, the disclosure is not limited thereto. Other non-limiting examples include, combustion engines, electrical motors, power plants, measuring equipment, any land-, water- and air-born vehicles, and so forth.

Figure 1:
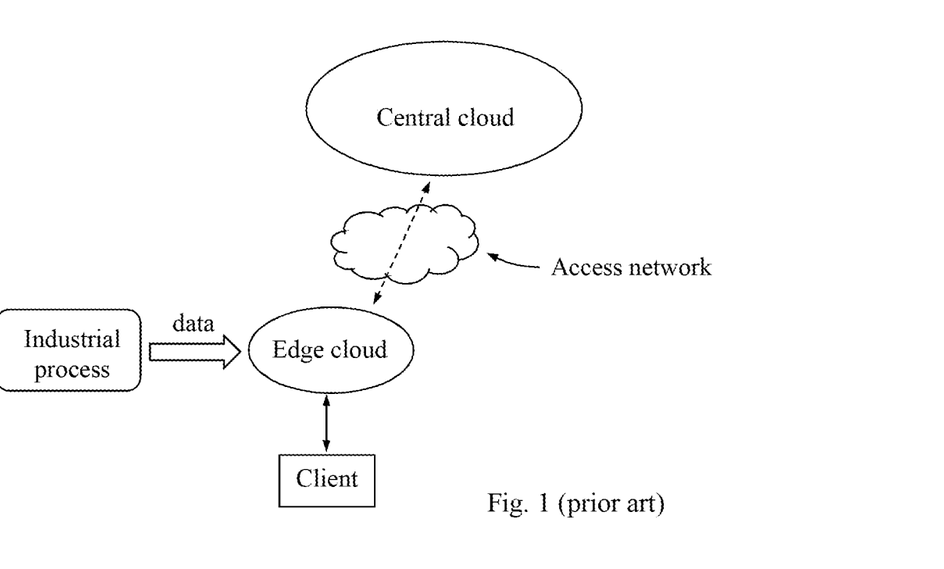
FIG. 1 is a schematic illustration of a typical cloud computing procedure, according to the prior art.

Recently, a technology known as "Edge computing" has been developed which can be used to optimize applications or cloud computing systems by executing at least some portion thereof at the "edge" of a cloud environment, herein called "edge cloud", which is generally closer to the clients and end users than the more traditional cloud core or "central cloud", as schematically illustrated in FIG. 1. This figure depicts that a client controls an edge cloud which executes machine learning operations on data generated in an industrial process. The edge cloud may communicate with a central cloud through an access network, e.g. if further computing resources are needed because the computing resources in the edge cloud are not sufficient.

In this context, the central cloud is sometimes also referred to as the "back-end cloud" which in practice may be comprised of several individually controlled and administrated sets of computing resources or central clouds. An edge cloud may be implemented at the client's premises such as in an industrial plant, a vehicle, a factory site, etc. The edge cloud may be connected to the central cloud so that certain operations controlled in the edge cloud may at least partly be executed in the central cloud involving exchange of data between the edge cloud and the central cloud.

In this disclosure, an edge cloud generally refers to a set of local computing resources controlled by a client which may communicate with the edge cloud through a suitable communication link, e.g. in a local network. Thereby, the edge cloud and its limited amount of computing resources are located close to the client as opposed to the central cloud which has virtually unlimited computing resources located relatively far away from the client resulting in higher latency and bandwidth consumption. Therefore, the edge cloud is more suitable for real-time computations requiring low latency while the central cloud is more suitable for complex resource-demanding computations requiring much resources though being tolerant to latency.

For example, a client may manage a set of IoT devices which supply data, measured or registered by various sensors, to an edge cloud. The data can then be processed by the computing resources in the edge cloud to produce various forms of output, depending on the implementation. The data processing may include performing analytics to attain some desired knowledge from the input data by feeding the data to a machine learning operation which includes applying a trained learning model on the data. The learning model is typically trained by applying a training algorithm on data generated in the industrial process. If the machine learning operation is performed at an edge cloud as described above, it is an advantage that the outcome of this operation can be delivered to a client with reduced latency and the bandwidth used for communications between the client and the edge cloud is also small compared to centralized cloud computing.

As indicated above, there are typically certain constraints in the above-described edge clouds in terms of resource availability, and the amount of available computing resources in an edge cloud is thus limited. As a result, it is often a problem that there are simply not enough computing resources available in an edge cloud to support and execute a machine learning operation which may be very complex and require substantial amounts of computing resources, particularly for executing a training algorithm. In that case, it will be necessary to perform the machine learning operation in the central cloud with the above-described drawbacks of high latency and bandwidth consumption in the communication of data and information between client and computing resources.

SUMMARY

It is an object of embodiments described herein to address at least some of the problems and issues outlined above. It is possible to achieve this object and others by using a method and a machine learning agent as defined in the attached independent claims.

According to one aspect, a method is performed by a machine learning agent for supporting machine learning applied on an industrial process by using computing resources in an edge cloud. In this method, the machine learning agent identifies at least one state of the industrial process, and selects a learning model comprising a training algorithm for the machine learning based on the identified at least one state. The machine learning agent also adapts the training algorithm in the selected learning model so that the amount of available computing resources in the edge cloud is sufficient for performing computations according to the training algorithm, and then applies the adapted training algorithm on data generated in the industrial process using computing resources in the edge cloud.

According to another aspect, a machine learning agent is arranged to support machine learning applied on an industrial process by using computing resources in an edge cloud. The machine learning agent is configured to identify at least one state of the industrial process, and to select a learning model comprising a training algorithm for the machine learning based on the identified at least one state. The machine learning agent is further configured to adapt the training algorithm in the selected learning model so that the amount of available computing resources in the edge cloud is sufficient for performing computations according to the training algorithm, and to apply the adapted training algorithm on data generated in the industrial process using computing resources in the edge cloud.

When using either of the above method and machine learning agent, in is an advantage that computing resources in the edge cloud can be used and no additional resources are needed, thus reducing latency and bandwidth consumption. Another advantage is that by adapting the training algorithm to how much computing resources are available in the edge cloud, it is possible to use these resources optimally by making the training algorithm as accurate as possible given the amount of available computing resources.

The above method and machine learning agent may be configured and implemented according to different optional embodiments to accomplish further features and benefits, to be described below.

A computer program is also provided comprising instructions which, when executed on at least one processor in the machine learning agent, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to avoid the need for using computing resources in a central cloud when the computing resources in an edge cloud are insufficient for executing certain machine learning operations applied on data generated in an industrial process. This can be achieved by reducing complexity of one or more training algorithms used for training a machine learning model, so as to reduce the amount of required computing resources enough to make the amount of available computing resources in the edge cloud sufficient for performing computations according to the training algorithm.

The solution will now be described and explained in terms of functionality in a machine learning agent which is operable to execute machine learning operations on data generated in an industrial process, by using computing resources in an edge cloud.

The term "machine learning agent" used throughout this disclosure can be understood as a logical entity that may be realized in one or more physical nodes connected to suitable parts in an industrial process that are capable of supplying data from the industrial process. The mechanism and procedure for generating data is naturally dependent on the nature of the industrial process and how it is working. The examples and embodiments described herein are applicable for any type of industrial process and it is therefore simply assumed that data suitable for input to a machine learning model is available from the industrial process. A practical implementation example will be described later on though.

The machine learning agent described herein may be responsible for various machine learning related activities such as model training, model evaluation, resource monitoring and agent-to-agent communication. The solution enables decentralized machine learning where machine learning and model training can be executed in real-time by the constrained edge cloud with a minimum of latency and bandwidth usage, while more resource demanding machine learning can still be performed by a centralized cloud.

Figure 2:
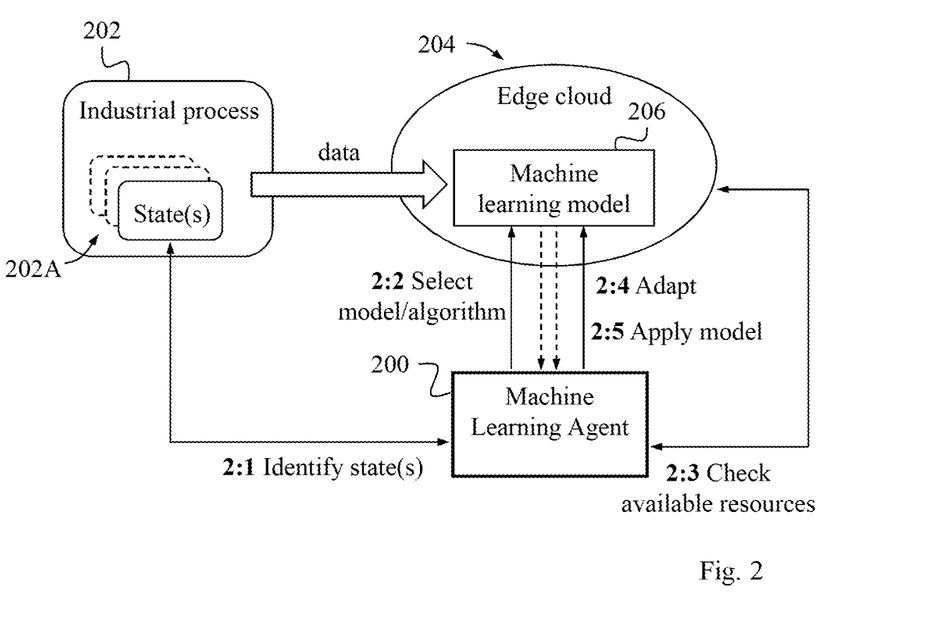
FIG. 2 is a communication scenario illustrating an example of how the solution may be employed by using a machine learning agent associated with an edge cloud, according to some example embodiments.

FIG. 2 illustrates an example of a procedure where a machine learning agent 200 operates to accomplish autonomous usage of computing resources in an edge cloud 204 for applying a machine learning model 206 on an industrial process 202. It is assumed that the machine learning model comprises a training algorithm that can be applied on data generated in the industrial process 202. It should be noted that a machine learning model may have more than one training algorithm and even though the examples herein are described in terms of "a training algorithm" the solution is not limited to only one.

The edge cloud 204 comprises a limited amount of computing resources which are considered available and can be used for executing machine learning operations. It may for example happen that some of the computing resources in the edge cloud 204 are currently occupied and engaged in other activities, which may or may not be controlled by the same machine learning agent 200, and those elsewhere occupied resources are therefore not available to serve the machine learning model 206 to be employed. The term "available computing resources" thus denotes computing resources that can be employed in the solution described herein for executing a training algorithm on data generated in the industrial process. Throughout this disclosure, it is simply assumed that there is some limited amount of available computing resources in the edge cloud 204 and the examples herein can be used to make those locally available computing resources enough for executing the machine learning.

The industrial process 202 can have different states occurring at different times and/or at the same time in different parts participating in the industrial process 202, such as e.g. active state and idle or resting state, as schematically indicated by 202A. The states may also refer to different operations being executed in the industrial process 202, or to different conditions or circumstances related to the industrial process 202. For example, if the industrial process 202 takes place in a driving equipment of a ship, the states may include sailing state, docking state, slow moving state, fast moving state, strong wind, light wind, and so forth. Two or more states may also occur in the industrial process 202 at the same time (in parallel) or at different times, as indicated above.

As said above, data is generated in the industrial process 202 which data can be subjected to machine learning operations. In this solution, such data is provided to and obtained by the edge cloud 204, to be applied on a machine learning model 206 which can be trained by utilizing a training algorithm that can be executed by using computing resources in the edge cloud 204. The machine learning model 206 may have been "pre-trained" by applying similar data on the model in beforehand using the training algorithm. The data generated in the industrial process 202 may also be used as a basis for identifying one or more states in the current industrial process 202, as described below.

A first action 2:1 illustrates that the machine learning agent 200 identifies one or more states 202A in the current industrial process 202, which may be done by means of a suitable logic in the machine learning agent 200, e.g. based on the generated data, or simply by receiving state information from the industrial process 202, depending on implementation which is however not necessary to describe here in any detail.

A machine learning model 206, or learning model for short, is then selected, e.g. out of a set of predefined learning models, based on the identified state(s), in another action 2:2. For example, a learning model that only uses data associated with the identified state(s) while disregarding other data, can be selected thereby reducing the amount of data that needs to be fed to and processed by the training algorithm in the learning model, which also reduces the amount of consumed resources. It should be noted that in this context, selecting "a learning model" should be understood as selecting at least one learning model and it is possible to select more than one model, e.g. different learning models for different states identified in the industrial process 202, to be further described later below.

Selecting a learning model may also include selecting the training algorithm to use in the learning model. Hence, both the learning model and the training algorithm can be state-dependent. It should be noted that a machine learning model does not necessarily include or have a training algorithm that is built/embedded to the model itself, although it may be said that models have corresponding training algorithms that can be executed in the machine learning agent.

A next action 2:3 illustrates that the machine learning agent 200 checks how much computing resources are currently available in the edge cloud 204, and finds that the amount of resources is not sufficient for performing computations according to the training algorithm in the selected learning model. Furthermore, the learning model and training algorithm may be selected in action 2:2 depending on how much computing resources are currently available in the edge cloud 204, which means that action 2:3 would need to be performed before action 2:2.

In a further action 2:4, the training algorithm in the selected learning model is adapted by reducing its complexity and need for computing resources, so that the amount of available resources in the edge cloud 204 becomes sufficient for performing computations according to the training algorithm. There are several ways of reducing complexity in a training algorithm and some examples will be described later below. The learning model 206 with the adapted training algorithm is then applied on the data supplied by the industrial process, using only computing resources in the edge cloud 204, in a final shown action 2:5.

Figure 3:
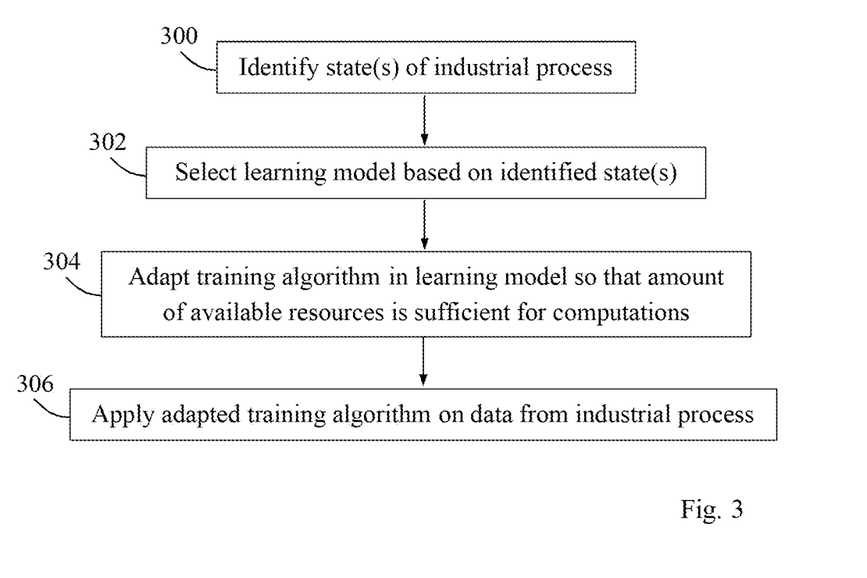
FIG. 3 is a flow chart illustrating a procedure in a machine learning agent, according to further example embodiments.

An example of how the solution may be employed in terms of actions performed by a machine learning agent such as the machine learning agent 200, is illustrated by the flow chart in FIG. 3 which will now be described with further reference to FIG. 2, although this procedure is not limited to the example of FIG. 2. FIG. 3 thus illustrates a procedure in the machine learning agent 200 for supporting machine learning applied on an industrial process 202 by using computing resources in an edge cloud 204. Some optional example embodiments that could be used in this procedure will also be described.

A first action 300 illustrates that the machine learning agent 200 identifies at least one state 202A of the industrial process, which corresponds to action 2:1 of FIG. 2. In another action 302, the machine learning agent 200 further selects a learning model 206 comprising a training algorithm for the machine learning, based on the identified at least one state. This action corresponds to action 2:2 of FIG. 2. In this action, the learning model 206 may be selected having a training algorithm that is most suitable and efficient for the identified state(s) and also requires a minimum of computing resources.

In action 302, the training algorithm may also be selected based on the identified at least one state, so that also the training algorithm is state-dependent. For instance, the same training algorithm may be included in different learning models, while a learning model might also have different training algorithms suitable for different states, and the solution is not limited in this respect.

In another action 304, the machine learning agent 200 further adapts the training algorithm in the selected learning model, which reduces the computing resources required, so that the amount of available computing resources in the edge cloud becomes sufficient for performing computations according to the training algorithm. This action corresponds to action 2:4 of FIG. 2. In a final action 306, the machine learning agent 200 applies the adapted training algorithm on data generated in the industrial process 202 using computing resources in the edge cloud, which corresponds to action 2:5 of FIG. 2. Thereby, only computing resources in the edge cloud can be used and no additional resources are needed.

When training an ML model in general, the model is continuously evaluated by applying available input values to the model to see how well a prediction generated by the model agrees with subsequent measurements and observations, which thus determines whether the model is "bad" or "good" in terms of accuracy of the model. These attributes imply that a bad model is not accurate enough and needs to be trained further while a good model is acceptable and requires no further training and can be used as is. A seemingly good model still needs to be evaluated from time to time since it may be degraded and turned bad due to changing conditions in the industrial process. Numerous techniques for machine learning as such have been described in the art, which is however outside the scope of this disclosure. Apart from training a learning model, "using" the model also consumes computing resources in the edge cloud.

Some further examples of embodiments that may be employed in the above procedure in FIG. 3 will now be described. In one example embodiment, the training algorithm in the selected learning model may be adapted by reducing complexity of the training algorithm to enable execution of the learning model with reduced amount of computing resources available in the edge cloud. In other words, when finding that more computing resources are needed in addition to those available in the edge cloud, the training algorithm is adapted in such a manner that it requires less computing resources so that the available computing resources in the edge cloud become sufficient for applying the training algorithm.

In further example embodiments, said adapting the training algorithm may comprise at least one of the following options A-F:

A) Reducing an amount of iterations performed in the training algorithm on the data generated in the industrial process. An iteration of a training algorithm means that data from the industrial process 202 is fed into the algorithm and a prediction generated by the model is compared with subsequent measurements and observations, i.e. the above-described evaluation of the model. Reducing the amount of iterations thus means that the model is evaluated less often.

B) Increasing a learning rate of the training algorithm. The learning rate is defined in the context of optimization that accelerates the decrease of a loss function. In other words, the learning rate indicates how much a single iteration affects the learning. Generally, a high learning rate has greater impact which may reduce the time required in training, although at the cost of accuracy of the model.

C) Increasing an interval of evaluating the learning model. This interval impacts the accuracy of the training algorithm. In more detail, the interval of evaluating the learning model refers to boundaries of acceptance in evaluation of the model such as model accuracy, logarithmic loss, mean squared error, etc.

D) Reducing an accuracy requirement for the selected learning model. This means that a lower accuracy of the model can be tolerated and still considering the model to be good (and useful).

E) Reducing a degree of a training algorithm used in the learning model. For example, some training algorithms (especially in regression based optimization and some neural networks that does not add non-linearity) may introduce higher degrees in independent variables used in the algorithm, e.g. $x^1$, $x^2$ or $x^3$. By reducing the maximum degree of the independent variable e.g. $x^3 \rightarrow x^1$, a less complex algorithm can be achieved albeit at the cost of accuracy.

F) Reducing the number of layers used in the learning model. This option refers to deep learning approaches, where a neural network with multiple layers introduce exponentially growing amount of computational operations. By reducing layers in a deep learning neural network, the computational demand is reduced exponentially, although at the cost of reduced amount of features that can be extracted from the data.

In another example embodiment, training data generated in the industrial process and used for training the learning model, may be divided into at least two state specific data sets where each data set is related to a corresponding state of the industrial process. Thereby, a training algorithm may be selected and adapted for each data set, and the machine learning agent 200 can apply the respective adapted training algorithms on the associated data sets as generated in the industrial process. If the learning model is already good for any of the data sets, it is not necessary to train the learning model which can thus be used for that data set. An example of such a division into data sets will be described further below.

When the latter embodiment is employed, another example embodiment may be that the identified at least one state may comprise any of: a lifecycle state, a resource availability state, a performance state, and a health status state. In more detail, each state 202A in the industrial process 202 may introduce different features or patterns of the generated data that may indicate that the states have different prioritization in objectives. Dividing the data into state specific data sets enables machine learning to be state specific which on the other hand reduces the computational time in training and can sometimes provide hidden information that is specific for a certain state. Such information might not be apparent from initial measurements.

In another example embodiment, said selecting a learning model may be further based on at least one objective of the machine learning to fulfil said objective(s). When the latter embodiment is employed, another example embodiment may be that the at least one objective comprises multiple state-specific objectives which are defined for respective states of the industrial process. The use of state-specific objectives will now be explained further.

The overall performance of the machine learning can be further improved by dividing machine learning objectives into state-specific objectives according to the identified states of the industrial process 202. The embodiments and examples herein enable the machine learning to be adaptive in such a way that the complexity of the training algorithms can be reduced so the needed training algorithms can be executed in the computationally constrained environment of the edge cloud.

State specific machine learning refers to the ability to distinguish different states of a system and tune the machine learning objective to be state specific. An example where state specific machine learning is employed will be described later below with reference to FIG. 5. State specific machine learning enables higher accuracy and reduced execution time in model training since the training data is divided into state specific sets which are thus subsets of the training data, and these sets may reveal state specific trends of the data. Trends, on the other hand, enable machine learning to extract state specific hidden information that can be exclusive for a certain state.

In another example embodiment, when multiple states are identified in the industrial process, a machine learning model may be selected and a training algorithm therein may be adapted for each identified state to reduce the amount of computing resources used for the respective training algorithms.

An example of how a machine learning agent may operate when employing the procedure of FIG. 3 for training a learning model for an industrial process, will now be described with reference to the block diagram illustrated in FIG. 4. In this example, a single state of the industrial process is identified for simplicity, and the following operations are performed by the machine learning agent 200 for training and evaluating a learning model using a training algorithm:

Operation 4:1

The learning model is trained by feeding data from the industrial process into the training algorithm. In this training operation, computing resources in the edge cloud are used.

Operation 4:2

The learning model is evaluated and validated by identifying the model as good or bad, as described above.

Operation 4:3

When the model identified as bad, conditional machine learning (ML) analyses the industrial process and selects optimal learning techniques considering the state of the industrial process, also referred to as the "system state". The selected learning techniques are used to define an optimal learning model for the current system state.

Operation 4:4

Several adaptive optimization steps are performed to reduce model complexity while still ensuring acceptable accuracy of the learning model. By returning to operations 4:1 and 4:2, the resulting model is again trained and validated against desirable optimization requirements. The machine learning agent 200 can perform another optimization iteration in operations 4:3 and 4:4 if the model is deemed bad and does not satisfy the optimization requirements.

Operation 4:5

When the model is identified as good in operation 4:2, the model can be used and needs no further training. As indicated above, operation 4:2 may be repeated from time to time to see if the model is still good or has been degraded and turned bad due to changed conditions or circumstances in the industrial process. As mentioned above, "using" a learning model also consumes computing resources in the edge cloud.

Figure 5:
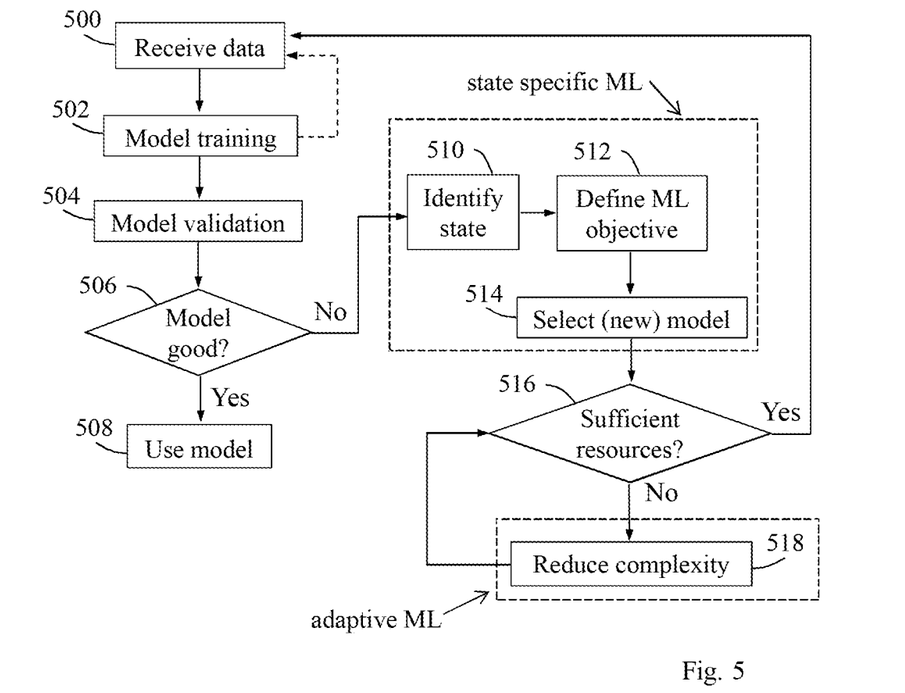
FIG. 5 is a flow chart illustrating an example of a more detailed procedure when the solution is used, according to further example embodiments.

An example of a more detailed procedure performed by the machine learning agent 200 when employing the procedure of FIG. 3, will now be described with reference to the flow chart in FIG. 5. This procedure may be performed for training and using a learning model per state of the industrial process, e.g. when multiple states have been identified. As in the above examples, a training algorithm is used for training the learning model by means of computing resources available in the edge cloud.

In a first action 500, data is received from the industrial process.

Figure 4:
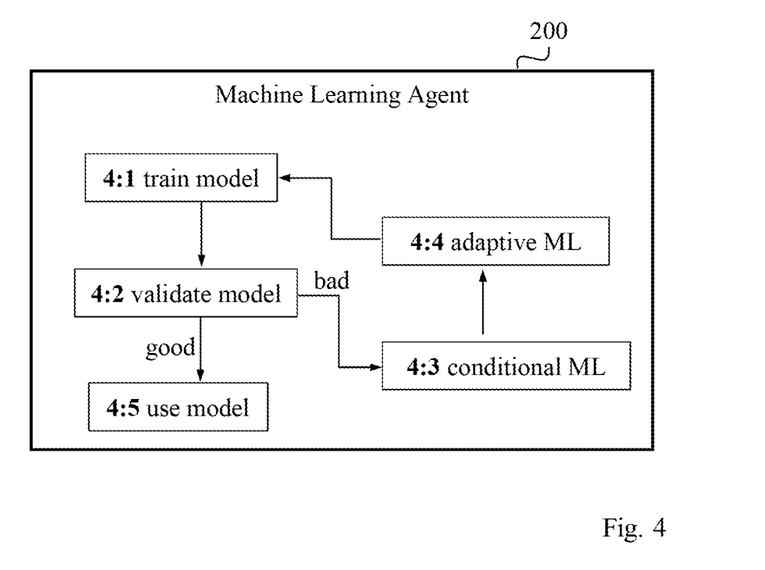
FIG. 4 is a block diagram illustrating how a machine learning agent may operate in more detail, according to further example embodiments.

In a next action 502, The learning model is trained by applying the training algorithm on the received data, as in operation 4:1 of FIG. 4.

In a next action 504, The learning model is validated as in operation 4:2 of FIG. 4.

In a next action 506, it is determined whether the model is good.

In a next action 508, If the model is good, it can be used without further training.

In a next action 510, If the model is not good, it is subjected to state-specific machine learning as indicated by a dashed box. In action 510, a state of the industrial process is identified, which may be done based on the received data.

In a next action 512, a state-specific optimization objective is defined for the identified state. Taking a ship as an example of industrial process, the optimization objective may be: find a minimal fuel consumption in sailing state.

In a next action 514, a learning model that is deemed to fulfil the state-specific optimization objective defined in the previous action, is selected from a set of predefined learning models. The selected learning model may be the same as one used previously, or a new model not used before.

In a next action 516, it is determined whether the computing resources available in the edge cloud are sufficient for applying the training algorithm on received data, which corresponds to action 2:3 in FIG. 2. If so, the procedure may return to action 500 to further train the model and repeat the subsequent actions as described above.

In a next action 518, the computing resources in the edge cloud are not sufficient for applying the training algorithm and its complexity is reduced in an action 518 by adapting the training algorithm, which may be done basically in the manner described above for actions 2:4, 304 and 4:4, respectively.

Another example of how a machine learning agent may operate when three different states can be identified in the industrial process, will now be described with reference to the schematic diagram illustrated in FIG. 6, again with reference to the machine learning agent 200.

Figure 6:
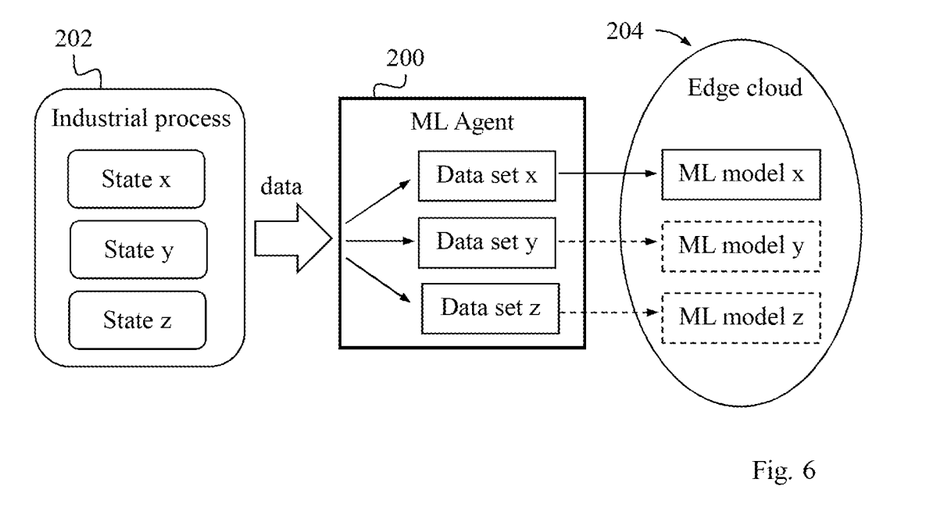
FIG. 6 is a schematic diagram illustrating how a machine learning (ML) agent may operate when three different states can be identified in the industrial process, according to further example embodiments.

In this example, the industrial process 202 has three distinguishable states x, y and z which can be identified in the manner described above for actions 2:1, 300 and 510, respectively. Data related to the states x, y and z is generated and supplied more or less continuously to the machine learning agent 200 which is able to distinguish and sort the incoming data into corresponding data sets x, y and z. It was mentioned above that two or more different states may be valid simultaneously or at different separate times. As a result, the data in two or all of the data sets x, y and z may be generated in parallel or during different separate time intervals, for example when the states are opposite to one another such as sailing and docking in the case of a ship. It may also happen that state x and y may be generated by different separate parts of some equipment while state z may refer to a condition common to both equipment parts.

In this example, state-specific learning models, indicated as ML models, are selected for all three states x, y, z and their associated data sets, hence ML model x and a corresponding training algorithm are selected for data set x, ML model y and its training algorithm are selected for data set y, and ML model z and its training algorithm are selected for data set z. The ML models x, y, z are then handled by using computing resources in the edge cloud 204. It may happen that any of the ML models x, y, z is already deemed good enough, e.g. by fulfilling some requirements for accuracy at validation, and this model can therefore be used and needs no training. When the data sets x, y, z are received and identified, machine learning can be handled for each data set by the machine learning agent 200 in the manner described above for FIG. 5.

Figure 7:
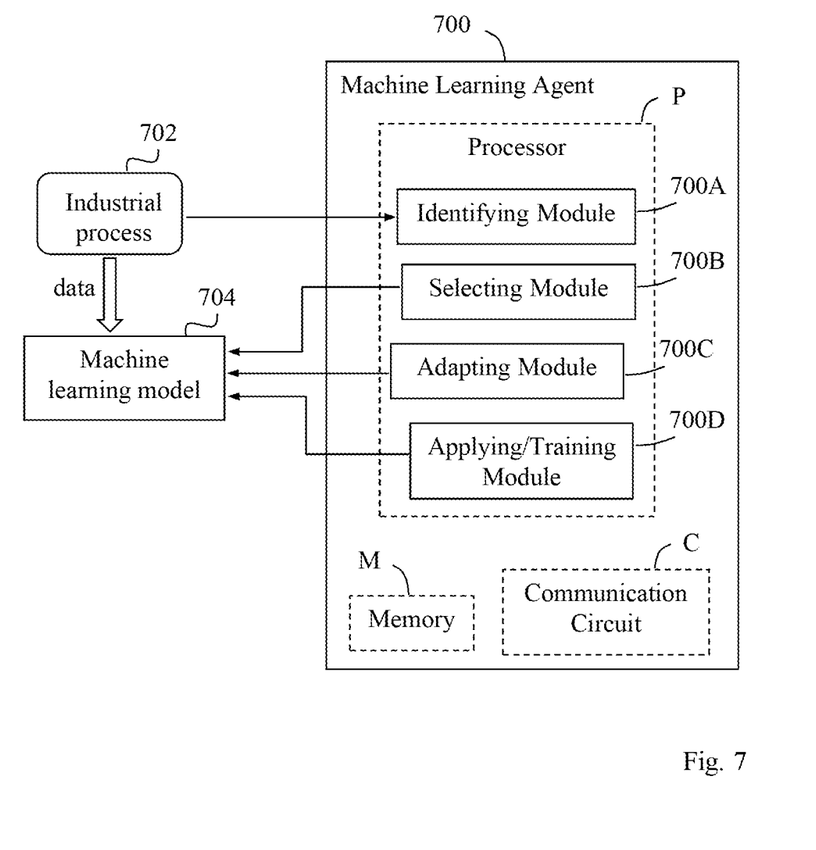
FIG. 7 is a block diagram illustrating how a machine learning agent may be structured, according to further example embodiments.

The block diagram in FIG. 7 illustrates a detailed but non-limiting example of how a machine learning agent 700 may be structured to bring about the above-described solution and embodiments thereof. In this figure, the machine learning agent 700 may be configured to operate according to any of the examples and embodiments of employing the solution as described herein, where appropriate. The machine learning agent 700 is shown to comprise a processor "P", a memory "M" and a communication circuit "C" with suitable equipment for transmitting and receiving information and messages in the manner described herein.

The communication circuit C in the machine learning agent 700 thus comprises equipment configured for communication using a suitable protocol for the communication depending on the implementation. The solution is however not limited to any specific types of messages or protocols.

The machine learning agent 700 is, e.g. by means of units, modules or the like, configured or arranged to perform at least some of the actions of the flow chart in FIG. 3 as follows.

The machine learning agent 700 is arranged to support machine learning applied on an industrial process 702 by using computing resources in an edge cloud. The machine learning agent 700 is configured to identify at least one state of the industrial process. This operation may be performed by an identifying module 700A in the machine learning agent 700, as also illustrated in action 300. The identifying module 700A could alternatively be named a state detecting module or process analysing module.

The machine learning agent 700 is also configured to select a learning model 704 comprising a training algorithm for the machine learning, based on the identified at least one state. This operation may be performed by a selecting module 700B in the machine learning agent 700, as also illustrated in action 302.

The machine learning agent 700 is further configured to adapt the training algorithm in the selected learning model so that the amount of available computing resources in the edge cloud is sufficient for performing computations according to the training algorithm. This operation may be performed by an adapting module 700C in the machine learning agent 700, as also illustrated in action 304. The adapting module 700C could alternatively be named a modifying module.

The machine learning agent 700 is also configured to apply the adapted training algorithm on data generated in the industrial process using computing resources in the edge cloud. This operation may be performed by an applying module 700D in the machine learning agent 700, as also illustrated in action 306. The applying module 700D could alternatively be named a training module, as indicated in the figure.

It should be noted that FIG. 7 illustrates various functional modules in the machine learning agent 700 and the skilled person is able to implement these functional modules in practice using suitable software and hardware equipment. Thus, the solution is generally not limited to the shown structure of the machine learning agent 700, and the functional modules therein may be configured to operate according to any of the features, examples and embodiments described in this disclosure, where appropriate.

The functional modules 700A-D described above may be implemented in the machine learning agent 700 by means of program modules of a computer program comprising code means which, when run by the processor P causes the machine learning agent 700 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The computer program may be carried by a computer program product in the machine learning agent 700 in the form of a memory having a computer readable medium and being connected to the processor P. The computer program product or memory M in the machine learning agent 700 thus comprises a computer readable medium on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the machine learning agent 700.

The solution described herein may thus be implemented in the machine learning agent 700 by a computer program comprising instructions which, when executed on at least one processor, cause the at least one processor to carry out the actions according to any of the above embodiments and examples, where appropriate. The solution may also be implemented at the machine learning agent 700 in a carrier containing the above computer program, wherein the carrier is one of an electronic signal, optical signal, radio signal, or computer readable storage medium.

Two examples of how the above embodiments and features could be implemented in real-life, will now be described.

EXAMPLE 1

A mobile device can improve its operational performance via machine learning considering the device as having an industrial process. Assume that the device's battery level is low and the mobile device needs to maintain certain essential operations such as communications and desired applications. It may not necessarily be beneficial to execute machine learning and model training locally in that device since that would increase the computational load which, on the other hand, would require usage of outside computational resources requiring extensive radio communication that increases the energy consumption.

In accordance with the embodiments herein, it is possible to distinguish states of the mobile device and scale down the model training to be executed in such device. Model training that is state specific and scaled down enables utilization of machine learning in computationally constrained environments even though the accuracy of the model may be reduced as the model training is scaled down.

EXAMPLE 2

Another example of real-world scenario could be a ship that is sailing on open ocean without connectivity, the ship thus corresponding to an industrial process. If the machine learning agent in an edge cloud located within the ship detects that the ship is not sailing with an efficient load, the agent can initialize machine learning based optimization. However, since the ship cannot communicate with any outside computational resources, it needs to decide if the computational resources are sufficient enough for resource demanding machine learning. To preserve the computational resources for other essential operations, the machine learning agents can adapt its state specific learning model and training algorithm in such a way that it can reduce the complexity of the algorithm enough to be processed with the resources of the edge cloud in the ship.

In addition to enabling local model training in constrained domains, adaptive machine learning in the manner described herein can be used to accelerate the model training procedure, thus facilitating faster model training.

While the solution has been described with reference to specific exemplifying embodiments, the description is generally only intended to illustrate the inventive concept and should not be taken as limiting the scope of the solution. For example, the terms "machine learning agent", "industrial process", "edge cloud", "computing resources", "learning model", "state" and "machine learning objective" have been used throughout this disclosure, although any other corresponding entities, functions, and/or parameters could also be used having the features and characteristics described here. The solution is defined by the appended claims.

The invention claimed is:

1. A method performed by a machine learning agent for supporting machine learning applied on an industrial process by using computing resources in an edge cloud, the method comprising:
   identifying at least one state of the industrial process;
   selecting a learning model comprising a training algorithm for the machine learning based on the identified at least one state;

adapting the training algorithm in the selected learning model so that the amount of available computing resources in the edge cloud is sufficient for performing computations according to the training algorithm; and applying the adapted training algorithm on data generated in the industrial process using computing resources in the edge cloud, wherein the machine learning agent is located in the edge cloud, wherein the edge cloud is a set of local computing resources with a limited amount of computing resources, wherein the training algorithm in the selected learning model is adapted by reducing complexity of the training algorithm to enable execution of the learning model with reduced amount of computing resources available in the edge cloud.

2. The method according to claim 1, wherein said adapting the training algorithm comprises one or more of:

reducing an amount of iterations performed in the training algorithm on the data generated in the industrial process;

increasing a learning rate of the training algorithm;

increasing an interval of evaluating the learning model;

reducing an accuracy requirement for the selected learning model;

reducing a degree of a training algorithm used in the learning model; and/or reducing the number of layers used in the learning model.

3. The method according to claim 1, wherein training data generated in the industrial process and used for training the learning model is divided into at least two state specific data sets where each data set is related to a corresponding state of the industrial process.

4. The method according to claim 1, wherein the identified at least one state comprises any of: a lifecycle state, a resource availability state, a performance state, and a health status state.

5. The method according to claim 1, wherein said selecting a learning model is further based on at least one objective of the machine learning to fulfil said objective(s).

6. The method according to claim 5, wherein the at least one objective comprises multiple state-specific objectives which are defined for respective states of the industrial process.

7. The method according to claim 1, wherein when multiple states are identified in the industrial process, a machine learning model is selected and a training algorithm therein is adapted for each identified state to reduce the amount of computing resources used for the respective training algorithms.

8. A computer program stored on a non-transitory computer readable medium, comprising instructions which, when executed on at least one processor, cause the at least one processor to carry out the method according to claim 1.

9. A machine learning agent arranged to support machine learning applied on an industrial process by using computing resources in an edge cloud, wherein the machine learning agent is configured to:

identify at least one state of the industrial process;

select a learning model comprising a training algorithm for the machine learning based on the identified at least one state;

adapt the training algorithm in the selected learning model so that the amount of available computing resources in the edge cloud is sufficient for performing computations according to the training algorithm; and apply the adapted training algorithm on data generated in the industrial process using computing resources in the edge cloud, wherein the machine learning agent is located in the edge cloud, wherein the edge cloud is a set of local computing resources with a limited amount of computing resources, wherein the machine learning agent is configured to adapt the training algorithm in the selected learning model by reducing complexity of the training algorithm to enable execution of the learning model with reduced amount of computing resources available in the edge cloud.

10. The machine learning agent according to claim 9, wherein the machine learning agent is configured to adapt the training algorithm by performing one or more of:

reducing an amount of iterations performed in the training algorithm on the data generated in the industrial process;

increasing a learning rate of the training algorithm;

increasing an interval of evaluating the learning model;

reducing an accuracy requirement for the selected learning model;

reducing a degree of a training algorithm used in the learning model; and/or reducing the number of layers used in the learning model.

11. The machine learning agent according to claim 9, wherein the machine learning agent is configured to divide training data generated in the industrial process and used for training the learning model, into at least two state specific data sets where each data set is related to a corresponding state of the industrial process.

12. The machine learning agent according to claim 9, wherein the identified at least one state comprises any of: a lifecycle state, a resource availability state, a performance state, and a health status state.

13. The machine learning agent according to claim 9, wherein the machine learning agent is configured to select a learning model further based on at least one objective of the machine learning to fulfil said objective(s).

14. The machine learning agent according to claim 13, wherein the at least one objective comprises multiple state-specific objectives which are defined for respective states of the industrial process.

15. The machine learning agent according to claim 9, wherein when multiple states are identified in the industrial process, the machine learning agent is configured to select a machine learning model and to adapt a training algorithm therein for each identified state to reduce the amount of computing resources used for the respective training algorithms.

* * * * *